United States Patent [19]

Willard

[11] 3,718,496

[45] Feb. 27, 1973

[54] TEXTURED CAUL PLATE SURFACED WITH FURNACE CEMENT

[75] Inventor: Jack August Willard, Hamilton, Ohio

[73] Assignee: Formica Corporation, Cincinnati, Ohio

[22] Filed: Nov. 16, 1970

[21] Appl. No.: 90,050

[52] U.S. Cl. ............... 117/10, 117/5.1, 117/70 C, 117/70 S, 117/119.8, 117/135.1, 156/581, 161/116, 161/DIG. 3, 164/45
[51] Int. Cl. ........ B32b 3/14, B32b 15/14, B44c 1/20
[58] Field of Search...117/10, 5.1, 70 C, 70 S, 119.8, 117/135.1; 264/219, 338, 134; 156/219, 581; 161/116, DIG. 3; 164/45, 249

[56] References Cited

UNITED STATES PATENTS

| | | | |
|---|---|---|---|
| 3,311,520 | 3/1967 | Michaelson et al. | 156/209 |
| 972,990 | 10/1910 | Brabrook | 117/5.1 |
| 3,487,133 | 12/1969 | Lindsay | 264/219 X |
| 2,890,492 | 6/1959 | Smith | 264/338 X |
| 1,353,621 | 9/1920 | Ashenhurst | 117/10 |
| 2,971,753 | 2/1961 | Hermans | 117/119.8 X |
| 489,011 | 1/1893 | Joyce | 117/5.1 X |
| 3,546,909 | 12/1970 | Gartrell | 117/10 X |
| 2,251,824 | 8/1941 | Edwards | 264/338 X |
| 2,388,299 | 11/1945 | Thielemann | 117/5.1 X |
| 2,989,418 | 6/1961 | Habaugh | 117/119.8 X |

*Primary Examiner*—Alfred L. Leavitt
*Assistant Examiner*—Thomas E. Bokan
*Attorney*—James T. Dunn

[57] ABSTRACT

A design imparting plate which used in the manufacture of decorative laminates is produced by the process of applying a coating of a viscous cementitious material onto a rigid metal plate; sculpturing a three dimensional design thereon and then heating the coated plate to permanently affix the sculpture design to the base plate.

6 Claims, No Drawings

TEXTURED CAUL PLATE SURFACED WITH FURNACE CEMENT

BACKGROUND OF THE INVENTION

Decorative laminates have been produced for a considerable number of years by a plurality of prior art processes. In making such laminates, it is conventional to utilize a plurality of resin impregnated core sheets generally composed of kraft paper which has been impregnated with a thermosetting resin and more particularly as a general rule with a thermosetting phenolic resin. When the kraft paper has been impregnated with the thermosetting resin, the sheets are dried and cut to the appropriate size. Thereupon a plurality of these resin impregnated sheets are stacked in a superimposed relationship. The number of plies in the stack will depend upon the ultimate intended use of the laminate. For most purposes the number of these core sheets will total about six to nine.

For decorative laminates, there is then placed on the stack of core sheets a decorative sheet which is generally a sheet of alpha-cellulose paper bearing a printed design or a light color and impregnated with a noble thermosetting resin which is not subject to any significant darkening upon the application of heat. Suitable resins for the decorative sheets are the aminotriazine resins and more particularly the unsaturated polyester resins, the epoxy resins and the like. It is generally desirable when making decorative laminates to make use of a protective overlay sheet which is similar to the decorative sheet but generally devoid of design and in the final laminate is transparent. Most laminates produced are heat pressure consolidated to a unitary structures in which the press plate is a polished stainless steel plate. Such an approach produces a very smooth surface laminate with a glossy finish. Other techniques are used to produce laminates with a smooth surface finish but with a satin or brushed textured effect. More recently the dictates of fashion have demanded textured laminates which can have three dimensional surface of glossy or dull finishes.

THE FIELD OF THE INVENTION

The present invention is in the field of making a textured design plate for use in making three dimensional textured decorative laminates and encompasses design latitude heretofore not possible to achieve and includes:

1. simulated design patterns such as those occurring in natural materials like slate, sandstone, brick, travertine marble, crazed terra cotta, rough or weathered timber; even material like rough woven goods such as jute, hemp and other natural materials such as leather and the like;
2. duplicate patterns such as low relief designs typical of figures and symbols;
3. creative patterns such as geometric, mosaic and non-objective designs.

DESCRIPTION OF THE PRIOR ART

The prior art, as it is known to the present inventor, relates to the manufacture of textured laminates by various techniques as is shown in the following U.S. Pat. Nos. 2,606,855, 3,303,081, 3,311,520, 3,308,227 and 3,373,068, which patents are incorporated herein by reference.

SUMMARY OF THE INVENTION

This invention relates to a process for the preparation of a textured design imparting plate for making decorative laminates which comprises, applying a coating of a refractory, cementitious paste onto one face of a rigid, rectangular metal base plate; sculpturing said coating while still viscous so as to form a three dimensional design; heating said coated plate to harden and permanently and tenaciously affix the sculptured design coating to the base plate.

The design imparting plate is prepared from a flat, rectangular, rigid metal plate that is approximately 0.135 inch in thickness and a suitable length and width in keeping with the size of the ultimate laminate to be produced, namely, 4 × 8 feet, 5 × 10 feet or 5 × 12 feet. We prefer to use a Mancro No. steel plate, because of the low relative dimensional change during subsequent repeated heating, and cooling during pressing operations. Other metal plates such as stainless steel, iron and the like could also be used.

I prefer the metal plate to have a thickness of about 0.135 inch. A plate thickness of much less than 0.135 inch is marginal in handling because of flexibility and would not be practical since the subsequent applied hard coating would flake or chip off the plate during handling. Thickness greater than 0.135 inch will work satisfactorily, but would be heavier and more difficult to handle.

The aforementioned plate is ground on one face with sand paper in order to achieve a course texture to enhance bonding of the subsequently applied cementitious coating. Other means for roughening the surface would work equally well, such as chemical etching and the like. The surface to be textured is cleaned with solvent to remove any and all foreign materials such as oil, dirt, etc.

Guidelines for the design are then marked in crayon on the textured face of the plate.

A cementitious material, black asbestos furnace cement paste is applied to the plate surface within the guidelines using spatula, pallet knife or stiff brushes to the desired thickness and design configuration, and while the furnace cement is still pliable, embellishment of the design is completed with standard modeling tools generally used by artists and sculptors for the modeling of clay. The modeled plate is permitted to harden at room temperature and final sculpturing is performed with chisels, scraper, files, rasp and the like.

The asbestos furnace cement used hereinabove is available commercially under the brand name of Evans Black Asbestos Furnace Cement and is comprised basically of:

a. asbestos fibers and
b. an aqueous solution of sodium silicate

The coated plate is heated in an air circulated oven for at least 16 hours at 80°C and preferably 48 hours at 100°C. The minimum time has been established in order to ensure that the coating has been hardened to the extent that it will not flow out during a subsequent high pressure and temperature laminating operation. Maximum baking time should be 100 hours at 100°C. Further heating would be a waste of time since the plate after such heating is fully ready for use.

The above baking operation removes the volatiles and hardens the cement thereby improving its bond to the base plate. The plate is then passed through a grinder which levels off high areas of the hardened coating to a desired maximum distance from the base of the plate. The grinding or machining step is optional but it is preferred in order to control precisely the ultimate depth of the protuberances to the valleys or base plate. Moreover, the machining or grinding of the coated plate provides a certain degree of aesthetic control of the artistic pattern. In actual practice, a great portion of the art work on the coated plate is untouched by the machining technique. After cleaning, the textured surface is coated with a silicone release agent and is allowed to air dry. The final dried plate is then ready for use.

The following is a detailed description of the process to produce a nominal 4 × 10 feet deep textured high pressure laminate. In the description, it will be obvious to anyone skilled in the art that the nominal 4 × 10 feet size deep textured laminate does not restrict the scope of the process to any particular size. All of the laminates in the following examples are pressed using the following cycle:

Pressure 350 psi for the first 10 minutes and 1400 psi for the remainder of the cycle; in the first sequence the temperature is maintained at about 135°C. for about the first 19 minutes thereupon the temperature is maintained between about 135°C. and 144°C. for the next 5 to 7 minutes; and, finally, the temperature is maintained at about 144°C. to 146°C. for the following 19 to 12 minutes.

The design-imparting plate is used to press against an assemblage of eight laminations of saturating Clupak kraft paper, available from Westvaco Paper Co., which has been impregnated with a water soluble phenolic resin to a 55 percent resin pickup and 14 – 20 percent flow level. An assembly is prepared preparatory to insertion in a laminating press of the following items reading from the top to the bottom:

the top most iron plate,
16 sheets of kraft paper cushion and,
the design imparting plate with the texture facing downward,
a layer of release paper,
a paper-backed aluminum release sheet, with the aluminum facing downward,
8 sheets of Clupak paper treated with the water soluble phenolic resin,
another layer of release paper,
eight sheets of kraft paper cushion,
a layer of release paper,
another iron plate,
16 sheets of kraft paper cushion,
an iron plate.

The assembly set forth hereinabove is introduced into the laminating press. After the pressing cycle is completed the assembly is removed from the press and the heat and pressure consolidated sheets of Clupak-treated-paper is recovered and is the opposite image of the original design model.

The resulting laminate is herein known as a master copy and is trimmed. This laminate will be useful in producing over 125 decorative laminates.

A decorative laminate assembly is prepared by superimposing over eight kraft paper core sheets impregnated with a thermosetting phenolic resin a thermosetting melamine resin impregnated decorative sheet, a thermosetting melamine resin impregnated overlay sheet. The master copy textured laminate is superimposed on this assemblage and the entire assembly heat and pressure consolidated to a unitary structure.

Upon removal from the press, the master laminate is separated from the textured decorative laminate. The three dimensional decorative laminate thus produced is subject to standard post-finish treatments such as trimming, sanding of the back such that the laminate variation in thickness between 0.050 inch and 0.070 inch and a rubbing operation on the surface to give it the desired finish.

In carrying out the various steps of the process, it is very frequently desirable to make the use of a release sheet or release paper that is positioned between the design imparting plate and the layers of resin impregnated paper to be converted to a design carrying laminate. These release members are used for both the surface and the back of the laminates. These different releases will change surface gloss and texture. Among those which may be used in the practice of the process of the present invention are Pat-a-par, a product of the Patterson Parchment Paper Co., glassine, polypropylene films, aluminum foils, paper-backed aluminum foils, wax paper and the like.

The foregoing is a preferred method for producing decorative laminate from the design imparting plate; however, it is recognized that a decorative laminate could be produced directly from the design imparting plate without going through the step of producing a phenol impregnated master.

The anticipated useful life of the first design imparting plate was estimated at about 100 pressings, now we have found that the design imparting plate has now been in use for over 2,500 pressings without showing any change in design fidelity or aesthetics.

EXAMPLE I

One face of a Mancro No. 2 steel plate 51 × 125 inches is sanded. A commercially available black asbestos furnace cement is coated onto the sanded surface, leveled, then sculptured into a slate design. The coating is permitted to harden; then further sculptured. The plate is dried in an air circulated oven for 48 hours at 100°C. Upon removal from the oven the plate is passed through a grinder wherein any abnormal high spots in the design are leveled. The side of the plate carrying the design is coated with a silicone release agent and is ready for use.

The design imparting plate is used to press against an assemblage of eight laminations of saturating Clupak kraft paper, available from Westvaco Paper Co., which has been impregnated with a water soluble phenolic resin to a 55 percent resin pickup and 14 – 20 percent flow level. An assembly is prepared preparatory to insertion in a laminating press of the following items reading from the top to the bottom:

the topmost iron plate,
16 sheets of kraft paper cushion and,
the design imparting plate with the texture facing downward,
a layer of release paper,
a paper-backed aluminum release sheet, with the aluminum facing downward,
eight sheets of Clupak paper treated with the water soluble phenolic resin, another layer of release paper,
eight sheets of kraft paper cushion,
another iron plate,
16 sheets of kraft paper cushion,
an iron plate.

The assembly set forth hereinabove is introduced into the laminating press. After the pressing cycle is completed the assembly is removed from the press and the heat and pressure consolidated sheets of Clupak-treated-paper is recovered and is the opposite image of the original design model.

The resulting laminate is herein known as a master copy and is trimmed.

A decorative laminate assembly is prepared by superimposing over eight kraft paper core sheets impregnated with a thermosetting phenolic resin, a thermosetting melamine resin impregnated decorative sheet and a thermosetting melamine resin impregnated overlay sheet. The master copy textured laminate is superimposed on this assemblage and the entire assembly heat and pressure consolidated to a unitary structure.

Upon removal from the press, the master laminate is separated from the textured decorative laminate. The three dimensional decorative laminate thus produced is subject to standard post-finish treatments such as trimming, sanding of the back such that the laminate variation in thickness between 0.050 inch and 0.070 inch and a rubbing operation on the surface to give it the desired finish.

EXAMPLE 2

Example 1 is repeated in all details except the sculptured design on the plate is a planked oak grain.

COMPARATIVE — EXAMPLE 3

Example one is repeated in all details except the asbestos furnace coated plate is dried in an oven for 1 hour at 80°C. After the plate is removed from the high pressure laminating press the first time, the design image was completely distorted and no longer useful.

COMPARATIVE — EXAMPLE 4

Example 1 is repeated in all details except in place of using the black asbestos furnace cement, a viscous mixture of a epoxy resin, catalyst, filler and binder was sculptured onto the surface of the steel plate and was air dried for 24 hours. When used to make a laminate, the composition exuded out of the press and the test was stopped.

The step of passing the baked plate through a grinder in order to level off high areas of the hardened coating to a desired maximum distance from the base of the plate is an optional one, but is generally preferred.

We claim:

1. A process for the preparation of a textured design imparting plate for making decorative laminates which comprises:
   a. applying a coating of a viscous, refractory cementitious paste which is asbestos furnace cement comprised of (a) asbestos fibers and (b) a sodium silicate aqueous solution, onto one face of a rigid, rectangular metal base plate;
   b. sculpturing said coating while still viscous, so as to form a three dimensional design thereof;
   c. baking the coated plate until the coating is tenaciously and securely bonded thereto as a hard fracture-resistant coating.

2. The process according to claim 1 in which said metal base plate is steel.

3. The process according to claim 1 in which said plate is machined to provide a uniform distance between the base plate and the tops of the protuberances of said hard coated design surface.

4. The process according to claim 1 in which said coated plate is heated in an air circulated oven for at least 16 hours at 80°C.

5. The process according to claim 1 in which the said coated plate is heated in an air circulated oven for 48 hours at 100°C.

6. An article of manufacture for use in imparting textured designs to decorative laminates comprising a flat rectangular rigid metal plate coated on one flat broad surface thereof with a refractory cementitious coating composition, which is asbestos furnace cement comprised of (a) asbestos fibers and (b) a sodium silicate aqueous solution, in a sculptured design wherein said coating composition is tenaciously and securely bonded to said surface as a hard fracture-resistant layer by baking.

* * * * *